June 20, 1972 M. BILAS 3,671,073
TILTABLE MOUNTING FOR DUMP TRUCK BODIES
Filed Nov. 12, 1970 2 Sheets-Sheet 1

INVENTOR.
MICHAEL BILAS
BY
ATTORNEY

United States Patent Office 3,671,073
Patented June 20, 1972

3,671,073
TILTABLE MOUNTING FOR DUMP TRUCK BODIES
Michael Bilas, 2730 Columbiana-New Castle Road, New Springfield, Ohio 44443
Filed Nov. 12, 1970, Ser. No. 88,629
Int. Cl. B65g 67/32
U.S. Cl. 298—17 S 5 Claims

ABSTRACT OF THE DISCLOSURE

A tiltable mounting for dump truck bodies positions a rotatable wedge shaped member on the dump truck frame in oppositely disposed matching relation to a fixed wedge shaped member positioned thereon and carrying the dump truck body in pivotal relation thereto. Means for imparting rotation to the rotatable wedge shaped member on the dump truck frame alters the relative positioning of the wedge shaped members and enables the dump truck body to be maintained on a transversely level plane despite transverse tilting of the truck frame axles and wheels as occurs when one of the wheel assemblies sinks into a soft supporting surface.

BACKGROUND OF THE INVENTION (1) Field of the invention

This invention relates to dump trucks having bodies pivoted to the truck frame and means for elevating the bodies so as to dump the contents therefrom.

(2) Description of the prior art

Prior structures of this type have usually provided only for a pivotal relation between the truck frame and the dump truck body with the result that upon the sinking of one of the truck wheel assemblies into a soft supporting surface imposing a transverse tilt to the truck frame, the elevated dump body moves sidewardly to a degree making a further dumping action impossible and frequently tipping over the entire dump truck. A prior art proposal to meet the problem is found in U.S. Pat. 3,041,111 wherein an arcuate track is mounted on the truck frame and the dump body carried on rollers engaged in the arcuate track. This invention eliminates the problems of the prior art structures by maintaining the support position of the dump body on the center line of the truck frame.

SUMMARY OF THE INVENTION

A tiltable mounting for dump truck bodies comprising a pair of oppositely disposed matching wedge shaped members arranged in superimposed position with one of the wedge shaped members being rotatable relative to the other and carried on a truck frame. The other of the wedge shaped members is fixed with respect to the truck frame and pivotally supports the dump truck body. Means is provided for imparting partial rotation to the rotatable wedge shaped member so that by such partial rotation the engaging angular surfaces of the superimposed wedge shaped members enables the dump truck body to be maintained on a transversely level plane despite tilting of the truck frame axle and supporting wheel assemblies.

DESCRIPTION OF THE PREFERRED EMBODIMENT

Figure 1:
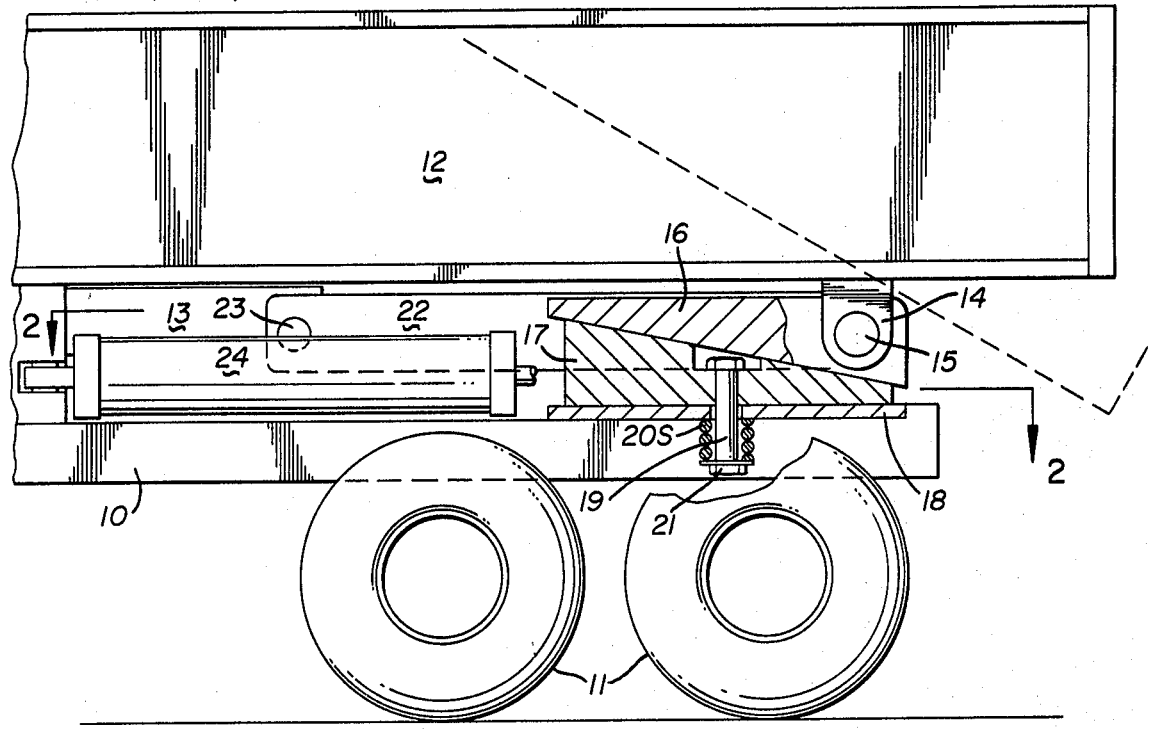
FIG. 1 is a side elevation with parts broken away and parts in cross section illustrating a portion of a truck frame and dump truck body with the tiltable mounting in position.

By referring to the drawings and FIG. 1 in particular it will be seen that a portion of a dump truck has been disclosed including a main frame 10, ground supporting wheels 11 therefor and a pivoted dump truck body 12 the forward portions of which rest on extensions 13 of the frame 10 and the rearward portion of which is pivoted by way of depending brackets 14 and pivot pins 15 to a wedge shaped member 16. The wedge shaped member 16 is positioned so that its lowermost surface comprises an inclined plane directly positioned on an oppositely disposed inclined plane forming the upper surface of a cylindrical wedge shaped member 17 which is rotatably positioned on a bearing plate 18 which, in turn, is carried on the frame 10 of the truck.

The cylindrical wedge shaped member 17 is rotatably secured to the bearing plate 18 by a bolt 19 with a tension spring 20 being positioned between the bearing plate 18 and a nut 21 on the bolt 19.

Still referring to FIG. 1 of the drawings it will be seen that the wedge shaped member 16 is held in fixed position relative to the frame 10 by means of a pair of trailing arms 22 which are pivoted at their forward ends by pivots 23 engaged in the extensions 13 of the frame 10. The trailing arms 22 are engaged at their rearward ends on the pivot pins 15 which are, in turn, engaged in the wedge shaped members 16. Thus, the wedge shaped member 16 is held in fixed position relative to the frame 10 while being supported by the cylindrical wedge shaped member 17 which is rotatable relative thereto.

Figure 2:
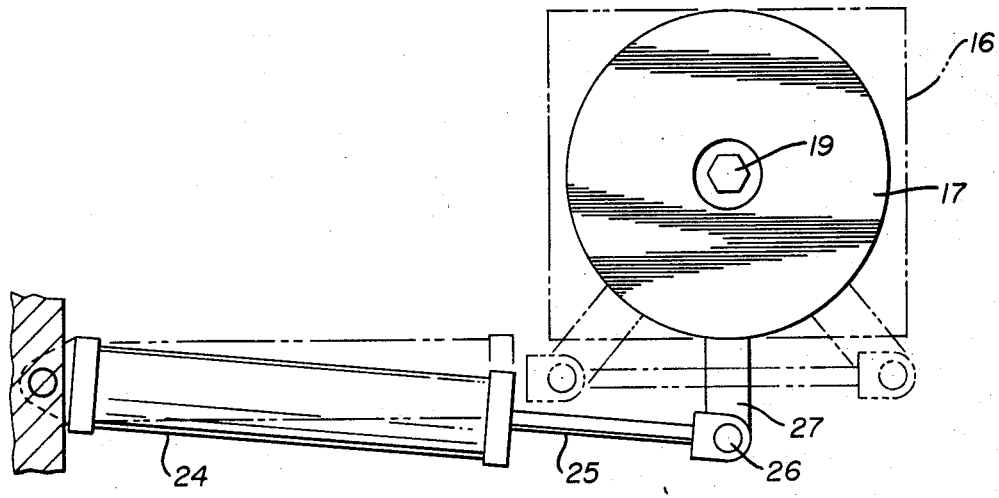
FIG. 2 is a top plan view on line 2—2 of FIG. 1 with broken lines indicating alternate positions of a rotatable member and the means for rotating it.
Figure 3:
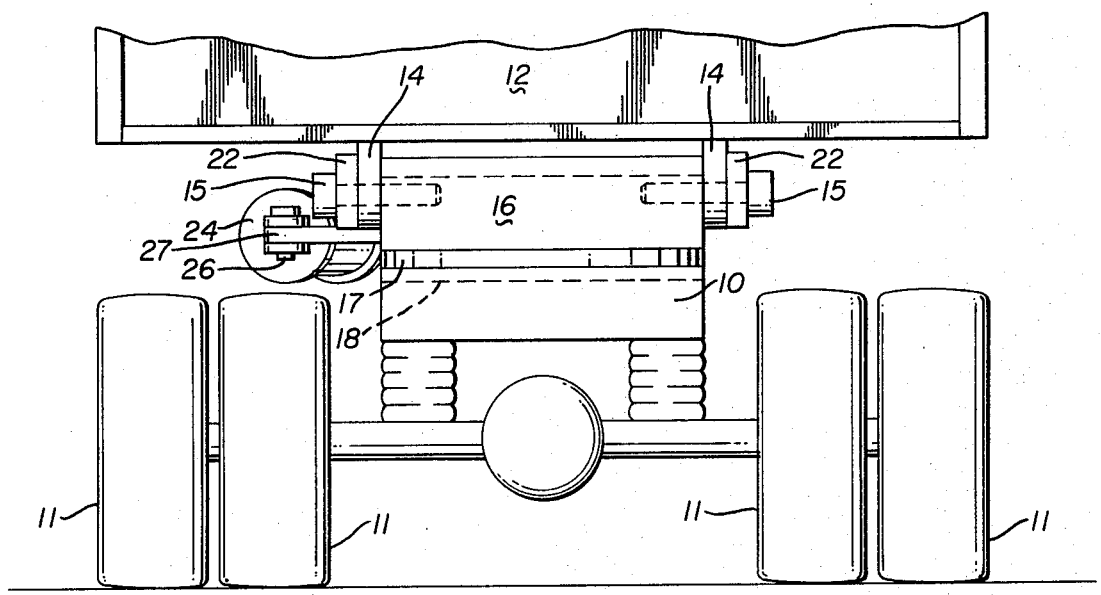
FIG. 3 is a rear elevation of a dump truck and body with parts broken away showing the wheel and axle and frame of the dump truck on level ground.

By referring now to FIGS. 1, 2 and 3 of the drawings it will be seen that means is provided for imparting rotary motion to the cylindrical wedge shaped member 17, said means comprises a hydraulic piston and cylinder assembly 24 the piston rod 25 of which is pivoted by a pin 26 to an arm 27 secured to the cylindrical wedge shaped member 17. Means not shown provides hydraulic fluid to the cylinder 24 so as to move the piston rod 25 and therefore partially rotate the cylindrical wedge shaped member 17.

By now referring to FIG. 3 of the drawings a rear elevation of a dump truck equipped with the tiltable mounting may be seen and it will be observed that the cylindrical wedge shaped member 17 is in the position shown in FIG. 1 of the drawings wherein its thickest portion is foremost and its thinnest portion rearmost. It will be observed that in such position the dump body 12 of the dump truck is on a transverse plane parallel with that of the frame 10 and the axle thereinunder.

Figure 4:
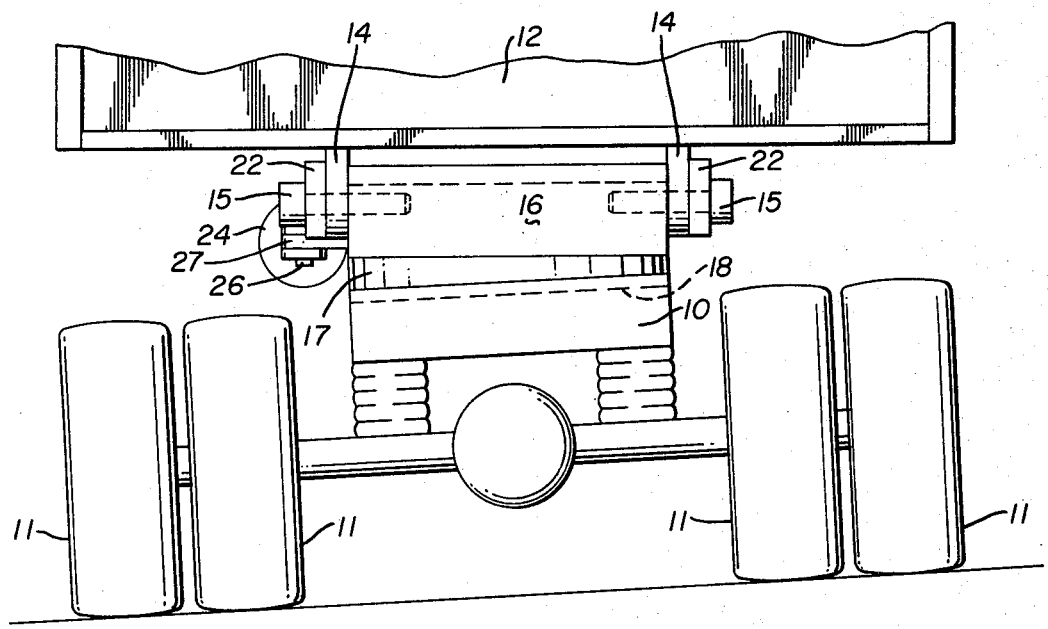
FIG. 4 is a rear elevation of a dump truck and body with parts broken away and showing the wheel and axle and truck frame on tilted ground with the tilting means supporting the body moved to a position compensating for the tilt of the axle and frame of the truck to maintain the body on a level plane.

By referring now to FIG. 4 of the drawings it will be observed that the wheels 11 and the axle supporting the frame 10 of the truck are on a tilted surface as for example where the ground supporting the wheels on one side of the truck is soft and permits the wheels to sink relative to the other rear wheels. Under such conditions the truck body 12 would normally be tilted to correspond with the tilt of the frame 10 and the axle supporting the same and when the dump body 12 is in elevated relation, the degree of tilt is magnified as the load in the uppermost portion of the elevated dump body is considerably off the vertical center line which condition usually results in wedging the dumping apparatus or tipping the truck over sidewardly.

In FIG. 4 of the drawings this condition has been corrected by a partial rotation of the cylindrical wedge shaped member 17 by the hydraulic cylinder 24 so that the thicker portion of the cylindrical wedge shaped member 17 is moved to the side corresponding with the lower position of the wheels and frame. Such compensating motion results in maintaining the wedge shaped member 16 and the dump body 12 on a transversely level plane so that a normal dumping action may be obtained without any danger of wedging the dump mechanism or tipping the truck over.

It will be observed by those skilled in the art that the degree of compensation imparted by the tilting mechanism disclosed herein may be varied from none to a considerable amount as the angular registering planes of the wedge shaped members 16 and 17 are moved relative to one another.

The above described structure provides relatively easy and fast tilting adjustment of the dump body level and it will occur to those skilled in the art that the hydraulic pump which is normally provided on a dump truck for actuating the dumping mechanism provides a source of fluid pressure for actuating the cylinder 24 subject to the control of appropriate valves not shown.

The structure is versatile in that it can be used on many types of vehicles where it is desirable to maintain the body in fixed or tilted relation to the supporting frame.

Although but one embodiment of the present invention has been illustrated and described it will be apparent to those skilled in the art that various changes and modifications may be made therein without departing from the spirit of the invention.

I claim:

1. In a vehicle having a frame and a body carried thereby means for tilting the body transversely relative to said frame, said means consisting of a pair of superimposed wedge shaped members, the upper and lower surfaces of which are normally parallel and the engaging surfaces of which are angular, means on said frame engaging the uppermost one of said superimposed wedge shaped members and acting to hold the same stationary relative thereto, means for imparting rotary motion only to the lower one of said wedge shaped members and means positioning said wedge shaped members between said frame and body of said vehicle.

2. The product of claim 1 wherein the vehicle is a dump truck and the body is pivoted to the upper one of said wedge shaped members.

3. The product of claim 1 wherein said means positioning said wedge shaped members includes a bearing plate and a pair of trailing arms, said arms being pivoted to said frame and the upper one of said wedge shaped members.

4. The product of claim 1 wherein said means positioning said wedge shaped members includes a bolt positioned through an opening in said wedge shaped member which is subject to the means for imparting rotary motion, and secured to said frame.

5. The product of claim 1 and wherein pivots engage said body and the opposite sides of the uppermost of said superimposed wedge shaped members and the free ends of a pair of trailing arms are engaged on said pivots, the other ends of said trailing arms being pivoted to said frame.

References Cited
UNITED STATES PATENTS

| | | | |
|---|---|---|---|
| 1,209,621 | 12/1916 | Richardson | 214—47 |
| 1,579,035 | 3/1926 | Ryan | 280—7 |

GERALD FORLENZA, Primary Examiner

J. MANNIX, Assistant Examiner

U.S. Cl. X.R.

280—6 H; 254—88